(12) United States Patent
Speth (10) Patent No.: US 7,278,087 B2
(45) Date of Patent: Oct. 2, 2007

(54) HARDWARE CIRCUIT FOR THE PUNCTURING AND REPETITIVE CODING OF DATA STREAMS, AND A METHOD FOR OPERATING THE SAID HARDWARE CIRCUIT

(75) Inventor: Michael Speth, Krefeld (DE)

(73) Assignee: Infineon Technologies AG, Munich (DE)

(*) Notice: Subject to any disclaimer, the term of this patent is extended or adjusted under 35 U.S.C. 154(b) by 94 days.

(21) Appl. No.: 10/505,055

(22) PCT Filed: Jan. 24, 2003

(86) PCT No.: PCT/DE03/00198

§ 371 (c)(1),
(2), (4) Date: Mar. 21, 2005

(87) PCT Pub. No.: WO03/071729

PCT Pub. Date: Aug. 28, 2003

(65) Prior Publication Data

US 2005/0160348 A1 Jul. 21, 2005

(30) Foreign Application Priority Data

Feb. 20, 2002 (DE) ................................. 102 07 146

(51) Int. Cl.
*H03M 13/03* (2006.01)
(52) U.S. Cl. ........................................ 714/790; 714/774
(58) Field of Classification Search ................ 714/790, 714/776, 774
See application file for complete search history.

(56) References Cited

U.S. PATENT DOCUMENTS

| | | | |
|---|---|---|---|
| 5,438,590 A | 8/1995 | Tzukerman et al. | |
| 5,566,189 A * | 10/1996 | Laskowski | 714/746 |
| 6,744,744 B1* | 6/2004 | Tong et al. | 370/320 |
| 6,885,711 B2* | 4/2005 | Shiu et al. | 375/340 |
| 6,954,885 B2* | 10/2005 | Hurt et al. | 714/701 |
| 2002/0085659 A1* | 7/2002 | Kim et al. | 375/377 |
| 2002/0114401 A1* | 8/2002 | Kim et al. | 375/262 |

FOREIGN PATENT DOCUMENTS

| | | |
|---|---|---|
| DE | 195 24 556 A1 | 1/1997 |
| WO | WO 00/03486 A1 | 1/2000 |
| WO | WO 01/05059 A1 | 1/2001 |
| WO | WO 02/05445 A1 | 1/2002 |

OTHER PUBLICATIONS

"3rd Generation Partnership Project; Technical Specification Group Radio Access Network; Multiplexing and Channel Coding (FDD) (Release 4)", 3GPP TS 25.212 V4.1.0 (Jun. 2001), 3 pgs.
International Search Report, International Application No. PCT/DE03/00198, International Filing Date Jan. 24, 2003, 2 pgs.

\* cited by examiner

*Primary Examiner*—Guy Lamarre
*Assistant Examiner*—Mujtaba K. Chaudry
(74) *Attorney, Agent, or Firm*—Eschweiler & Associates, LLC (57) ABSTRACT

An apparatus is used for outputting an input data block comprising a plurality of bits as an output data block with at least one puncturing or with at least one repetition of at least one bit. The apparatus comprises an association unit for associating the bits in the input data block with the bits in the output data block on the basis of an alterable puncturing or repetition pattern ($inc_w(k)$). The association unit is a hardware circuit which is designed to execute both puncturing and repetitive coding.

13 Claims, 6 Drawing Sheets

HARDWARE CIRCUIT FOR THE PUNCTURING AND REPETITIVE CODING OF DATA STREAMS, AND A METHOD FOR OPERATING THE SAID HARDWARE CIRCUIT

RELATED APPLICATION

This application is a national stage application of International Application No. PCT/DE03/001198 filed Jan. 24, 2003, which is entitled "HARDWARE CIRCUIT FOR THE PUNCTURING AND REPETITIVE CODING OF DATA STREAMS, AND METHOD FOR OPERATING THE HARDWARE CIRCUIT", which was not published in English, and claims priority to German Patent Application Ser. No. 102 07 146.2, which was filed on Feb. 20, 2002, which is hereby incorporated by reference in its entirety.

FIELD OF INVENTION

The invention relates to an apparatus for puncturing and repeating bits in a data stream and also to a method which can be used to operate the hardware circuit.

BACKGROUND OF THE INVENTION

The omission of bits in a data stream is called puncturing. The repetition of individual bits in a data stream is called repetitive coding.

It is known practice to perform puncturing or repetitive coding of data streams using puncturing or repetition masks, which are used to impress a fixed puncturing or repetition pattern onto a prescribed number of bits in a data stream per clock cycle. However, using such a rigid mask means that the puncturing or repetition pattern is unalterable, so that a new mask is required whenever the pattern is altered. Greater flexibility in terms of the variability of the puncturing and repetition patterns is provided by digital signal processors (DSPs). However, a pure software solution implemented on a digital signal processor requires a relatively high level of computation complexity, since a plurality of computation operations are necessary each time a bit is processed.

The application WO 01/05059 A1 discloses an apparatus for rate matching for data streams with a demultiplexer, parallel apparatuses for puncturing or repetitive coding, and also a multiplexer. The demultiplexer associates the various components contained in the incoming data stream (e.g data or check symbols) with the various parallel paths in the apparatus. Following rate matching for the component data streams in the individual paths by means of puncturing or repetitive coding using a fixed puncturing or repetition pattern, the bits are combined into a joint data stream again in the multiplexer.

SUMMARY OF THE INVENTION

It is therefore an object of the invention to provide an apparatus for the puncturing and repetitive coding of data words and, in particular, of data streams which allows the use of alterable puncturing and repetition patterns and which has a high data processing speed. In addition, the aim is to specify a method which can be used to operate the inventive apparatus.

An apparatus based on the invention is used for converting an input data word comprising a plurality of bits into an output data word and for outputting the data word. To this end, a plurality of input data words enter the apparatus as an input data block. Similarly, the output data words are output from the apparatus as an output data block. At least one output data word in the output data block has at least one puncturing in comparison with the associated input data word, i.e. a bit in the original input data word has been omitted or at least one bit in the input data word has been repeated at least once. For this purpose, the apparatus comprises an association unit which associates the bits in an input data word with the bits in the associated output data word on the basis of an alterable puncturing or repetition pattern. The association unit is a hard-wired circuit which is designed to execute both puncturing and repetitive coding.

The inventive apparatus affords the advantage that it can be used for selectively performing the puncturing or the repetitive coding of data words, the puncturing or repetition patterns used being variable. Despite this flexibility, on account of the hardware implementation the inventive apparatus has a higher data processing speed than software-based puncturing or repetitive coding executed on a digital signal processor.

In line with one particularly advantageous refinement of the invention, the association unit contains a plurality of association elements which each have a logic input and a logic output. The association elements create an association between a bit in an input data word and one or no bit in the associated output data word. The number of association elements therefore indicates the number of bits which can be processed by the inventive apparatus per processing cycle. A suitable choice of the number of association elements makes it possible to match the data processing speed to the system requirements in optimum fashion.

In the case of one implementation of the inventive apparatus, the association elements may be implemented, by way of example, as a cascade of multiplexers which connect data and addresses to one another.

In another particularly advantageous refinement of the invention, the inventive apparatus comprises a control unit, a first address generation unit and a second address generation unit. The control unit takes prescribed puncturing or repetition information and generates the puncturing or repetition pattern. The puncturing or repetition pattern is supplied to the first address generation unit, which produces first addresses therefrom. The second address generation unit produces second addresses. If the inventive apparatus is operated as a puncturing apparatus, the first addresses are used for the logic outputs of the association elements for respective association with a bit in the output data word. In this case, the second addresses are used for continuously associating the logic inputs of the association elements with a respective bit in the input data word. If the inventive apparatus is used as a repetition apparatus, the first addresses are used by the logic inputs of the association elements for respective association with a bit in the input data word. In this case, the second addresses represent an association between the outputs of the association elements and the bits in the output data word in a continuous fashion.

The above-described design of the inventive apparatus allows the prescribed puncturing or repetition information to be converted particularly easily into puncturing or repetitive coding of a data word. With altered puncturing or repetition selections, the control unit merely needs to generate a new puncturing or repetition pattern, so that new first addresses can then be produced by the first address generation unit. As compared with the prior art, this eliminates any interchange of hardware elements which may have been necessary to date.

Advantageously, the inventive apparatus comprises an input memory, which can store at least one input data word for buffer storage, and/or an output memory, which can buffer-store at least one output data word. In particular, the input memory and the output memory are respectively designed in the form of a plurality of registers which can each store one bit. The first and second addresses are associated with the respective registers in the input and output memories by the association elements.

Another advantage is when the input memory has a first rewriteable memory connected upstream of it for storing input data, and/or the output memory has a second rewriteable memory connected downstream of it for storing output data. The rewriteable memories make it possible to process data streams using the inventive apparatus. Incoming input data blocks are buffer-stored in the first rewriteable memory until the association unit is ready to process them. The second rewriteable memory can be used to output the processed data as output data blocks.

One particularly advantageous refinement of the invention is characterized in that the association unit has a plurality of control units. This measure makes it possible to process interleaved data streams using the inventive apparatus. As a result, each data stream may be allocated a dedicated puncturing or repetition pattern, for example.

Preferably, the control units, the first address generation unit and the second address generation unit are each in hard-wired form. In general terms, however, these units may also be implemented in software.

In addition, provision may preferably be made for the control unit or possibly the plurality of control units to produce one or more puncturing or repetition patterns based on the UMTS standard 3GPP TS 25.212.

The inventive apparatus can be operated using the inventive method. This involves the apparatus being operated in cycles k (k=0, 1, 2, ... ). The control unit produces control signals $inc_w(k)$ in each cycle k. The number of control signals $inc_w(k)$ produced per cycle k is Wmax. The first address generation unit produces a first address $pd_w(k)$ for each association unit MUXw in each cycle k. Each cycle k is initialized using a first initialization address $pd_{ini}(k)$. The number of association elements MUXw in the apparatus is Wmax (w=0, 1, ..., Wmax-1). The input data word has Lmax bits. The first addresses $pd_w(k)$ are calculated on the basis of the following recursive rules:

$$pd_0(k)=pd_{ini}(k) \quad (1)$$

$$pd_w(k)=(pd_{w-1}(k)+inc_{w-1}(k)) \bmod L\max \quad (2)$$

$$pd_{ini}(k+1)=(pd_{Wmax-1}(k)+inc_{Wmax-1}(k)) \bmod L\max \quad (3)$$

$$pd_{ini}(0)=0 \quad (4)$$

The control signal $inc_w(k)$ determines the processing of the bit applied to the input of the association element MUXw. If the control signal $inc_w(k)$ is equal to zero, this indicates that the bit applied to the input of the association element MUXw needs to be punctured or repeated. If the control signal $inc_w(k)$ is equal to 1, the bit applied to the input of the association element MUXw is neither punctured nor repeated and is thus transmitted in constant form. So that the logic outputs of the association elements MUXw and MUX(w+1) are not simultaneously associated with one bit in the output data word when the bit applied to the input of the association element MUXw is punctured, the logic output of the association element MUXw is deactivated in this case.

A recursive calculation of the first addresses $pd_w(k)$ results in a computation complexity of Wmax additions for calculating all first addresses $pd_w(k)$ in a cycle k. When the first address generation unit is implemented in hardware, only Wmax adders and a correspondingly small area requirement are therefore necessary.

The second addresses $ps_w(k)$, which are produced in each cycle k by the second address generation unit for each association element MUXw, may advantageously be calculated on the basis of the following recursive rules:

$$ps_0(k)=ps_{ini}(k) \quad (5)$$

$$ps_w(k)=(ps_{w-1}(k)+1) \bmod L\max \quad (6)$$

$$ps_{ini}(k+1)=(ps_{Wmax-1}(k)+1) \bmod L\max \quad (7)$$

$$ps_{ini}(0)=0 \quad (8).$$

In this case, $ps_{ini}(k)$ indicates a second initialization address, which is used to initialize the cycle k.

BRIEF DESCRIPTION OF THE DRAWING

The invention is explained in more detail below with reference to the drawings, in which.

DETAILED DESCRIPTION OF THE INVENTION

Figure 1:
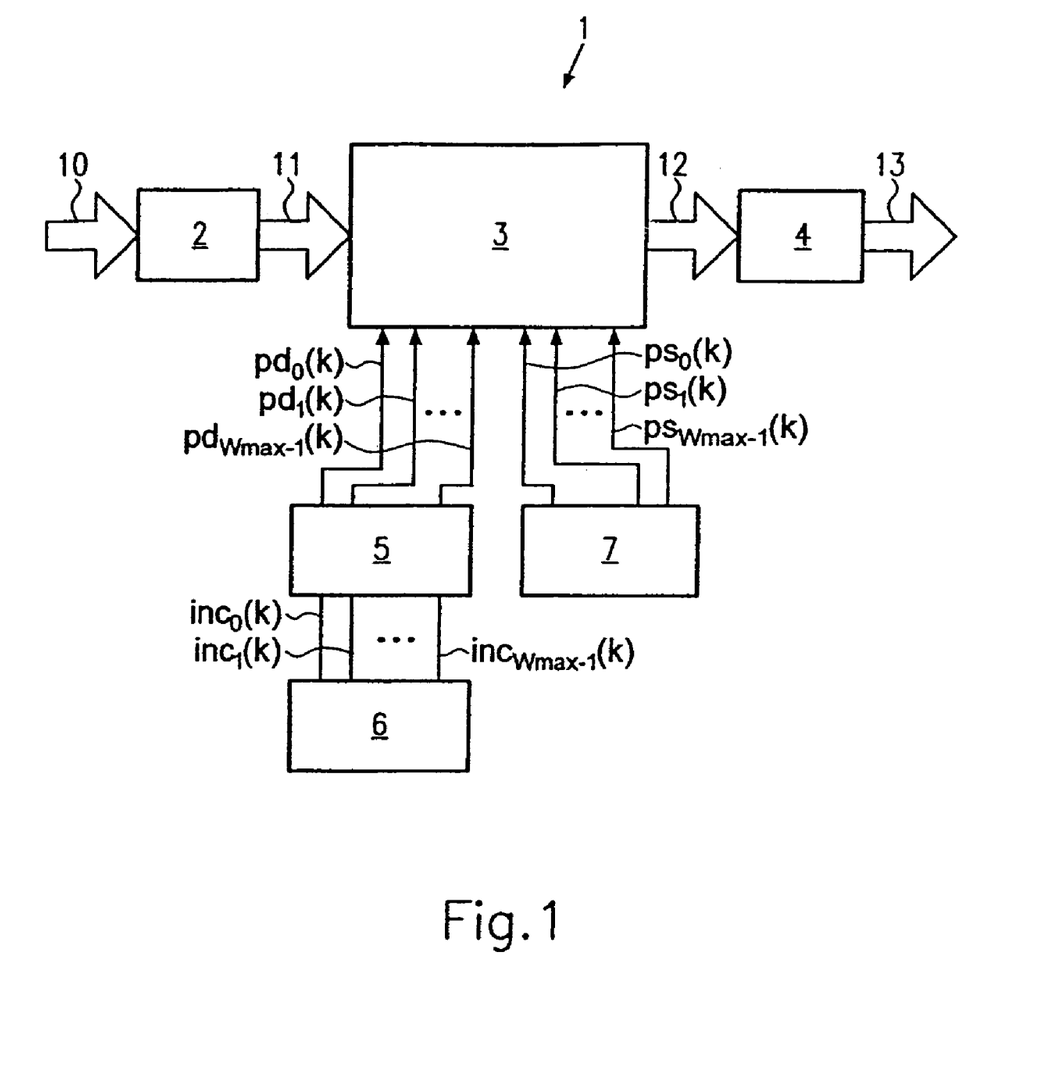
FIG. 1 shows a schematic diagram of a first exemplary embodiment of the inventive apparatus.

FIG. 1 shows a schematic diagram of a first exemplary embodiment of the inventive apparatus 1. Data entering the apparatus 1 in a data stream 10 are buffer-stored in an input memory 2. In this case, the data enter the apparatus 1 as data blocks. A respective data block contains a plurality of data words. The data are retrieved cyclically from the input memory 2 as data words 11 by a puncturing/repetition unit 3. Following processing in the puncturing/repetition unit 3, the processed data are supplied as data words 12 to an output memory 4 and are then output from the apparatus 1 as data blocks in a data stream 13.

In the puncturing/repetition unit 3, data have a puncturing or repetition pattern applied to them in each processing cycle k (k=0, 1, 2, ... ). The respective puncturing or repetition pattern is available in a control unit 6 or is produced by the latter on the basis of information supplied to it. The control unit 6 generates control signals $inc_w(k)$ which can assume the values 0 and 1 (w=0, 1, ..., Wmax-1). In this case, the convention applies that $inc_w(k)=0$ states puncturing or repetition of a particular bit. By contrast, the rule $inc_w(k)=1$ states that the bit need neither be punctured nor repeated. In each processing cycle k, the puncturing/repetition unit 3 may process a maximum of Wmax bits. The control unit 6 therefore outputs Wmax control signals $\text{inc}_w(k)$ per processing cycle k.

The control signals $\text{inc}_w(k)$ are supplied to an address generation unit 5 which generates addresses $\text{pd}_w(k)$ on the basis of the control signals $\text{inc}_w(k)$. An address generation unit 7 produces addresses $\text{ps}_w(k)$. Both the addresses $\text{pd}_w(k)$ and the addresses $\text{ps}_w(k)$ feed the puncturing/repetition unit 3. The functions of the addresses $\text{pd}_w(k)$ and $\text{ps}_w(k)$ are explained below.

Figure 2:
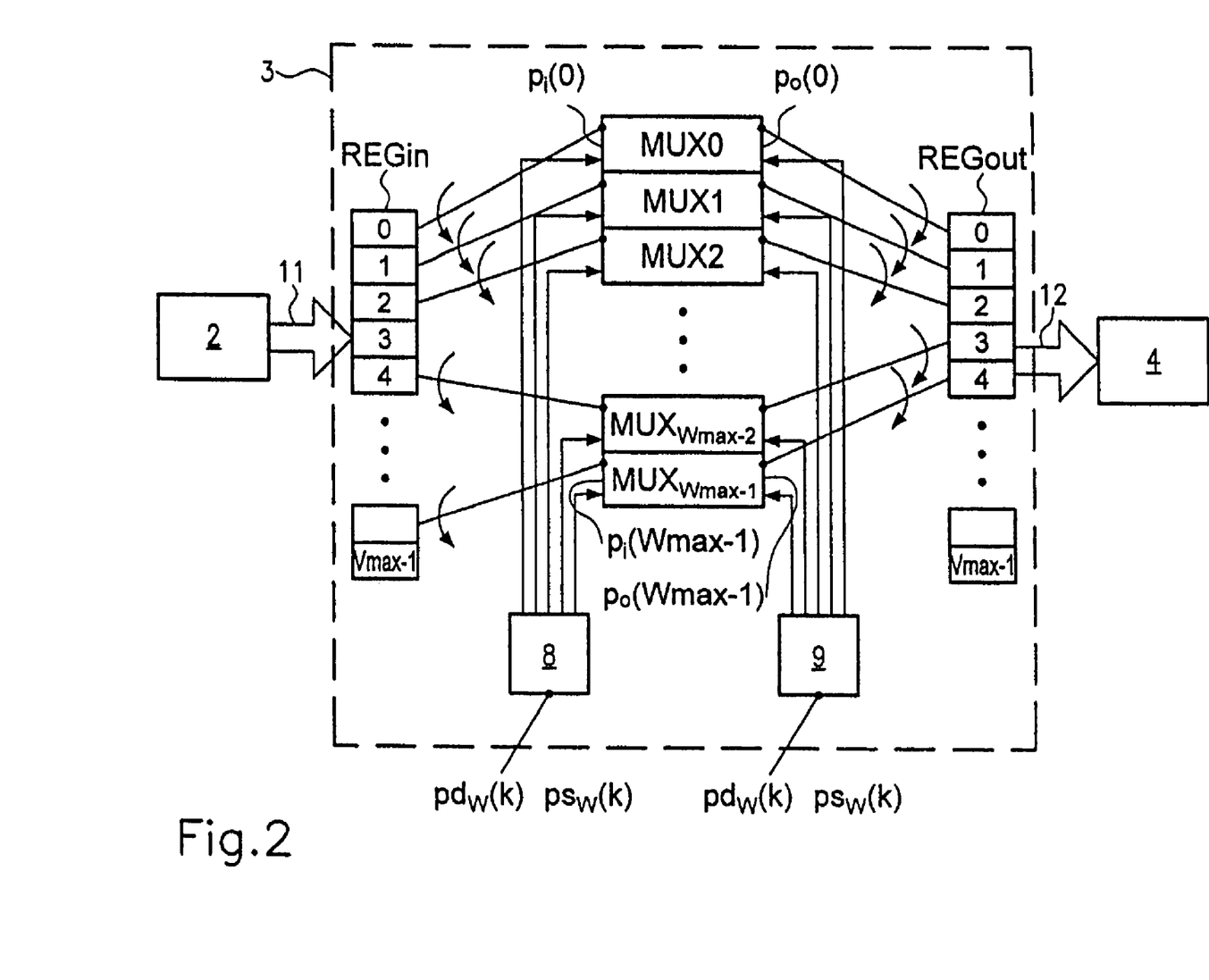
FIG. 2 shows a more detailed excerpt from the schematic diagram shown in FIG. 1.

FIG. 2 shows the puncturing/repetition unit 3 in more detail. The puncturing/repetition unit 3 contains an input register unit REGin, an output register unit REGout and association elements MUXw (w=0, 1, Wmax-1) arranged between the register units REGin and REGout. The input register unit REGin and the output register unit REGout each comprise Vmax registers which can each store one bit. The number of association elements MUXw is Wmax. Each association element MUXw has a logic input and a logic output. The logic inputs can be associated with the registers in the input register unit REGin. The logic outputs can be associated with the registers in the output register unit REGout. For these associations, the inputs of the association elements MUXw have input addresses $p_i(w)$, and the outputs of the association elements MUXw have output addresses $p_o(w)$. The input addresses $p_i(w)$ and the output addresses $p_o(w)$ may have either the addresses $\text{pd}_w(k)$ or the addresses $\text{ps}_w(k)$ associated with them. To this end, two switching units 8 and 9 are provided which are switched according to the mode of operation. In the case of puncturing, the addresses $\text{pd}_w(k)$ are associated with the output addresses $p_o(w)$ of the association elements MUXw, and the addresses $\text{ps}_w(k)$ are associated with the input addresses $p_i(w)$ of the association elements MUXw. In the case of repetitive coding, the addresses $\text{pd}_w(k)$ are associated with the input addresses $p_i(w)$ of the association elements MUXw, and the addresses $\text{ps}_w(k)$ are associated with the output addresses $p_o(w)$ of the association elements MUXw. While the addresses $\text{pd}_w(k)$ are determined by the puncturing or repetition pattern, the addresses $\text{ps}_w(k)$ are in a form such that they connect the inputs or outputs of the association elements association elements MUXw continuously to registers in the input register unit REGin or to registers in the output register unit REGout. The addresses $\text{ps}_w(k)$ can be produced in the address generation unit 7, for example by a counter.

Since the addresses $\text{pd}_w(k)$ are produced using the control signals $\text{inc}_w(k)$, the control signal $\text{inc}_w(k)$ indicates, when $\text{inc}_w(k)=0$, that the bit applied to the logic input of the association element MUXw needs to be punctured or repeated. If, by contrast, $\text{inc}_w(k)=1$, then the bit applied to the logic input of the association element MUXw need neither be punctured nor repeated.

When provision is made for the bit applied to the logic input of the association element MUXw to be punctured, this bit is overwritten by the bit applied to the logic input of the association element MUX(w+1). So that this does not involve the logic outputs of the association elements MUXw and MUX(w+1) being simultaneously associated with a register in the output register unit REGout, the output of the association element MUXw is disabled in suitable fashion for this puncturing.

Repetition of the bit applied to the logic input of the association element MUXw is achieved by virtue of the input address pi(w+1) of the association element MUX(w+1) being set equal to the input address $p_i(w)$ of the association element MUXw.

The registers in the input register unit REGin are partially emptied in a processing cycle k by the associations made by the association elements MUXw. In the next processing cycle k+1, the registers in the input register unit are filled with data from the input memory 2. In the present first exemplary embodiment, the association elements MUXw can process a data word having a maximum word length of Wmax in a processing cycle k. So that the input register unit REGin contains sufficient bits for the processing during each processing cycle k, the number Vmax of registers in the input register unit REGin needs to be at least twice Wmax. This ensures continuous operation of the apparatus 1. If discontinuous operation of the apparatus 1 is also acceptable, however, then Vmax can be chosen to be smaller.

Figure 3:
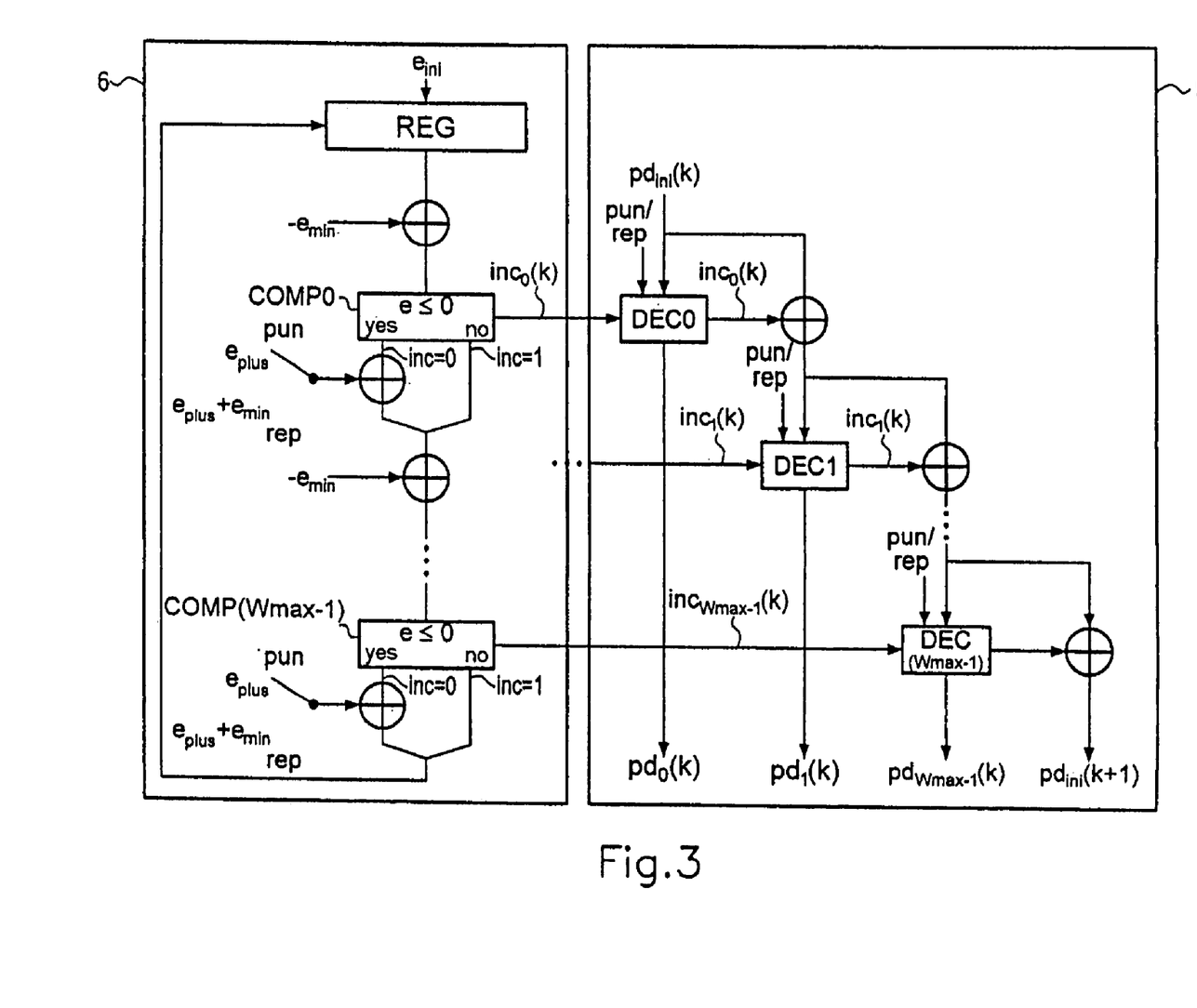
FIG. 3 shows architectures or hardware-based implementations of an algorithm for producing the puncturing or repetition pattern based on the UMTS standard 3GPP TS 25.212 and the address generation unit 5.

FIG. 3 shows the architectures or the hardware-based implementations both of an algorithm for producing the puncturing or repetition pattern and of the address generation unit 5. The algorithm implemented here for producing patterns is indicated in section 4.2.7.5 of the UMTS standard 3GPP TS 25.212 V4.0.0. This section of the UMTS standard is hereby incorporated into the content of the disclosure of the present patent application. When considering the structure shown in FIG. 3 on an instruction-oriented basis, it may also be interpreted as a flowchart for illustrating an exemplary embodiment of the inventive method, which can be used to operate an apparatus based on the invention. First, an algorithm which the control unit 6 uses to calculate the control signals $\text{inc}_w(k)$ in each processing cycle k is shown by way of example in this case. Secondly, the exemplary embodiment in FIG. 3 illustrates the method which takes place in the address generation unit 5 and which is used to calculate the addresses $\text{pd}_w(k)$ from the control signals $\text{inc}_w(k)$.

When the control unit 6 is first activated (k=0), a register REG is preinitialized using an initialization value $e_{ini}$. Next, Wmax control signals $\text{inc}_w(k)$ are calculated per processing cycle k. To this end, a value $e_{min}$ is first subtracted from the initialization value $e_{ini}$, and the result is supplied to a comparator COMP0 as input value. The comparator COMP0 produces the control signal $\text{inc}_0(k)$ as output signal. In addition, the comparator COMP0 checks whether the input value supplied to it is less than or equal to zero. Depending on the result of this check, the comparator COMP0 makes a branch in the subsequent processing. If the input value for the comparator COMP0 is less than or equal to zero, the signal at the relevant output of the comparator COMP0 is set to the value zero, and then this signal has a value $e_{plus}$ added to it during puncturing and has the values $e_{plus}$ and $e_{min}$ added to it during repetitive coding. If the input value for the comparator COMP0 is greater than zero, the signal at the relevant output of the comparator COMP0 is set to the value one. Subsequently, the procedure with the signals produced in this manner is the same as that described above for the comparator COMP0. To this end, the control unit 6 contains a total of Wmax comparators COMPw (w=0, 1, . . . , Wmax-1), which are used to calculate the control signals $\text{inc}_w(k)$. The signal which is output from the comparator COMP(Wmax-1) is supplied, possibly after it has been increased by the value corresponding to the respective mode of operation, to the register REG as initialization value for the next processing cycle k+1.

From the Wmax control signals $\text{inc}_w(k)$, Wmax addresses $\text{pd}_w(k)$ are produced in the address generation unit 5 per processing cycle k. To this end, an initialization value $\text{pd}_{ini}(k)$ is set equal to zero when the address generation unit 5 is first activated (k=0). The addresses $\text{pd}_w(k)$ can be calculated on the basis of the following equation:

$$pd_w(k) = \left(pd_{ini}(k) + \sum_{i=0}^{w-1} inc_i(k)\right) \bmod V\max \quad (9)$$

Equation (9) can be used to derive the following recursive rules:

$$pd_0(k) = pd_{ini}(k) \quad (10)$$

$$pd_w(k) = (pd_{Wmax-1}(k) + inc_{Wmax-1}(k)) \bmod V\max \quad (11)$$

$$pd_{ini}(k+1) = (pd_{Wmax-1}(k) + inc_{Wmax-1}(k)) \bmod V\max \quad (12)$$

$$pd_{ini}(0) = 0 \quad (13)$$

To avoid a situation in which puncturing the bit applied to the logic input of the association element MUXw involves the logic outputs of the association elements MUXw and MUX(w+1) being associated with the same register in the output register unit REGout, the present exemplary embodiment has provision for such puncturing to involve a decision-making unit DECw (w=0, 1, ..., Wmax-1) setting the address $pd_w(k)$ to a value which is situated outside of the value range for the association with the registers in the output register unit REGout. This measure deactivates the logic output of the association element MUXw de facto when puncturing the bit applied to its logic input.

The method shown in FIG. 3 for calculating the addresses $pd_w(k)$ may also be used to calculate the addresses $ps_w(k)$. To this end, it is merely necessary to set all of the control signals $inc_w(k)$ equal to one. The recursive computation rules obtained are therefore:

$$ps_0(k) = ps_{ini}(k) \quad (14)$$

$$ps_w(k) = (ps_{w-1}(k) + 1) \bmod V\max \quad (15)$$

$$ps_{ini}(k+1) = (ps_{Wmax-1}(k) + 1) \bmod V\max \quad (16)$$

$$ps_{ini}(0) = 0 \quad (17)$$

The particular feature of the architecture shown in FIG. 3 is that it allows both repetition algorithms and puncturing algorithms to be implemented using just one circuit, although these algorithms have a fundamental structural difference.

Through simple modifications, the apparatus 1 shown in FIG. 1 can be designed such that a plurality of partial data streams b (b=0, 1, ..., Bmax-1) which are interleaved in one another can be processed. A schematic diagram of such an apparatus 21 is shown in FIG. 4 as a second exemplary embodiment of the inventive apparatus.

Like the apparatus 1, the apparatus 21 comprises an input memory 22, a puncturing/repetition unit 23 and an output memory 24. The input memory 22 receives a data stream 30 which is made up of the partial data streams b. From there, the data are read in the form of data words 31 by the puncturing/repetition unit 23. Following processing in the puncturing/repetition unit 23, the processed data are buffer-stored as data words 32 in an output memory 24 and are then output from the apparatus 21 as data stream 33.

In addition, the apparatus 21 has an address generation unit 25, an address generation unit 27, control units 26.b (b=0, 1, ..., Bmax-1) and a selection unit 28. The number Bmax of control units 26.b is the same as the number Bmax of partial data streams b to be processed. Each of the control units 26.b produces control signals $inc_{b,u}(k)$ (b=0, 1, ..., Bmax-1; u=0, 1, ..., Umax$_b$-1) for a respective one of the partial data streams b, the index u denoting the respective associated association element MUXu. In this context, account has been taken of the fact that possibly each of the partial data streams b has different data lengths Umax$_b$. In each processing cycle k the selection unit 28 establishes that partial data stream b to which the bits applied to the logic inputs of the association elements MUXw belong. In line with this, the selection unit 28 generates control signals $b_w(k)$ (w=0, 1, ..., Wmax-1) which select the appropriate control signals $inc_{b,u}(k)$ generated by the control units 26.b and then use them to generate the addresses $pd_w(k)$.

Figure 4:
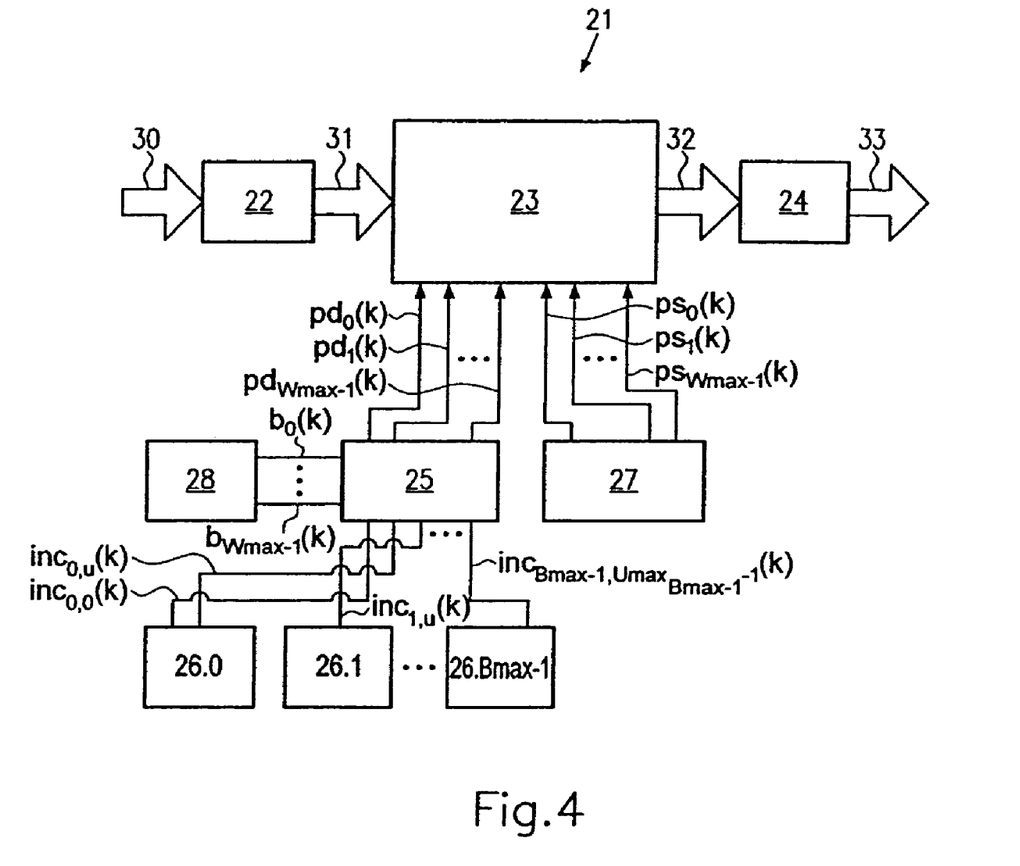
FIG. 4 shows a schematic diagram of a secondary exemplary embodiment of the inventive apparatus.

The apparatus 21 shown in FIG. 4 may be used, by way of example, in the 3GPP standard in which "bit separation" and "bit collection" are carried out.

Figure 5:
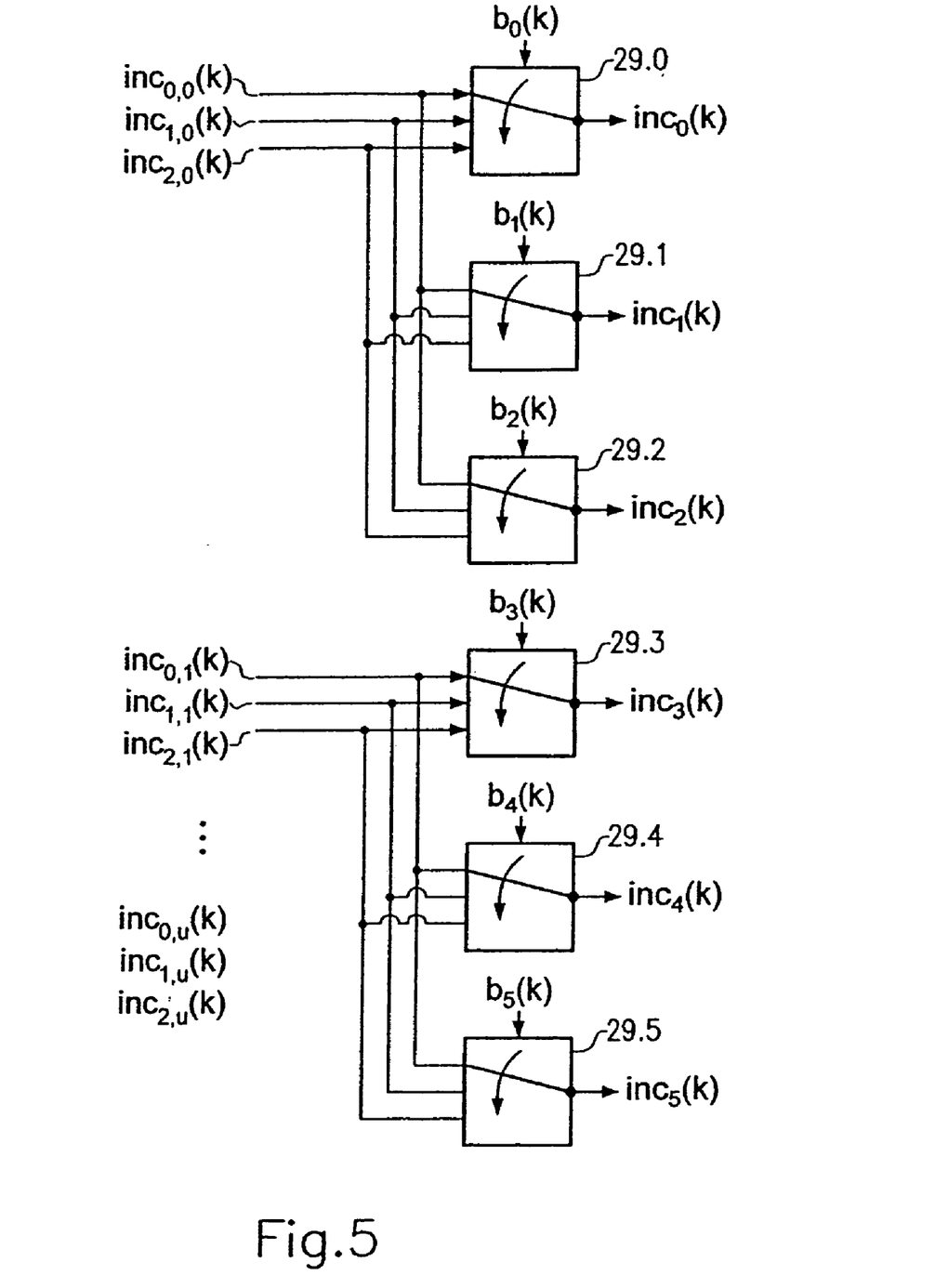
FIG. 5 shows a more detailed excerpt from the schematic diagram shown in FIG. 4.

FIG. 5 schematically shows an excerpt from the address generation unit 25 shown in FIG. 4 for the case Bmax=3. The switching units 29.w (w=0, 1, ..., Wmax-1) use the control signals $inc_{b,u}(k)$ and $b_w(k)$ to produce the control signals $inc_w(k)$ which are required for the association elements MUXw.

Figure 6:
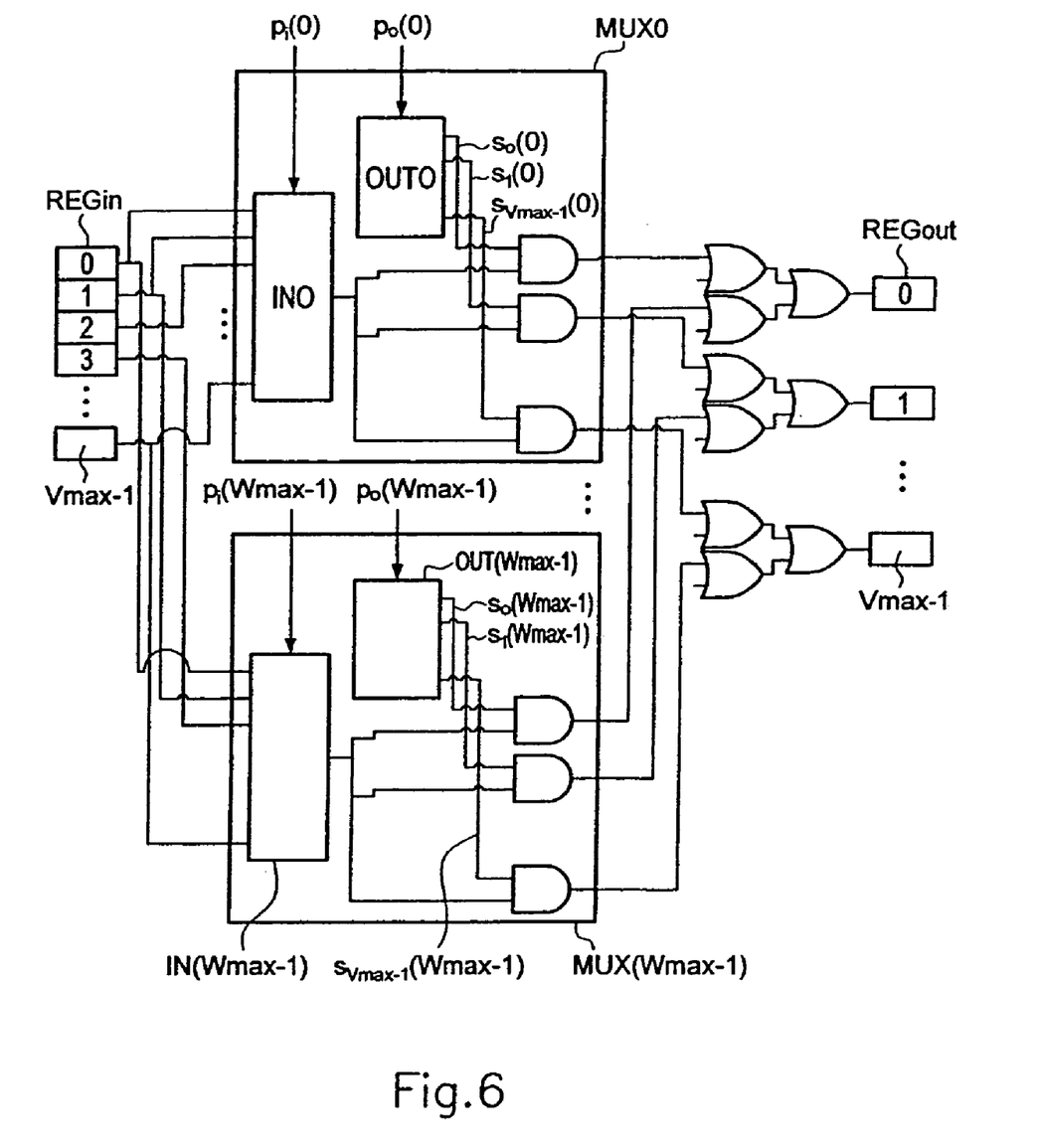
FIG. 6 shows a schematic diagram of an exemplary embodiment of the association elements MUXw.

FIG. 6 shows, by way of example, how the association elements MUXw may be implemented. Each association element MUXw has an input multiplexer INw and an output decoder OUTw (w=0, 1, ..., Wmax-1), respectively. The inputs of each input multiplexer INw are connected to the registers in the input register unit REGin. An input multiplexer INw selects the valid register in the input register unit REGin on the basis of the input address $p_i(w)$. The output decoder OUTw uses the output address $p_o(w)$ to generate Vmax control signals $s_v(w)$ (v=0, 1, ..., Vmax-1). ANDing the control signals $s_v(w)$ with the output signal from the input multiplexer INw associates the selected register in the input register unit REGin with one of the registers in the output register unit REGout.

Each register in the output register unit REGout has OR functions connected upstream of it which combine the outputs of the association elements MUXw with one another. In this case, the address generation described above ensures that none of the registers is simultaneously overwritten by a plurality of association elements MUXw.

If the valid addresses $p_o(w)$ pass through values from 0 to Vmax-1, the rule $s_v(w)=1$ applies to the control signals $s_v(w)$ when $p_o(w)=v$. Otherwise, the rule is $s_v(w)=0$. This ensures that, in the case of an invalid address, the output of the respective association element MUXw is not associated with any register in the output register unit REGout.

The invention claimed is:

1. An apparatus for outputting an input data block comprising a plurality of bits as an output data block with at least one puncturing or with at least one repetition of at least one bit, where the input data block contains a plurality of input data words having a respective plurality of bits, and the output data block contains output data words associated with the input data words, the apparatus comprising:

an association unit for associating the bits in an input data word with the bits in the associated output data word on the basis of an alterable puncturing or repetition pattern, the association unit being a hardware circuit which is designed to execute both puncturing and repetitive coding, and the association unit having a plurality of association elements which each have a logic input and a logic output for associating a bit in an input data word with one or no bit in the associated output data word;

a control unit for producing the puncturing or repetition pattern on the basis of prescribed puncturing or repetition information; and a first address generation unit for producing first addresses for the logic outputs of the association elements for respective association with a bit in the output data word on the basis of the puncturing pattern and for producing first addresses for the logic inputs of the association elements for respective association with a bit in the input data word on the basis of the repetition pattern.

2. The apparatus as claimed in claim 1, further comprising:
a second address generation unit for producing second addresses for the logic inputs of the association elements for continuous association with a respective bit in the input data word when the apparatus is operated as a puncturing apparatus, and for producing second addresses for the logic outputs of the association elements for continuous association with a respective bit in the output data word when the apparatus is operated as a repetition apparatus.

3. The apparatus as claimed in claim 1, further comprising:
an input memory for buffer-storing at least one input data word, the input memory comprising a plurality of registers which are respectively designed to store a bit, and
an output memory for buffer-storing at least one output data word, the output memory comprising a plurality of registers which are respectively designed to store a bit.

4. The apparatus as claimed in claim 3, further comprising:
a first rewriteable memory. connected upstream of the input memory for storing input data blocks, and
a second rewriteable memory connected downstream of the output memory for storing output data blocks.

5. The apparatus as claimed in claim 2, further comprising a plurality of control units.

6. The apparatus as claimed in claim 2, wherein the control unit, the first address generation unit and the second address generation unit are each designed as hardware.

7. The apparatus as claimed in claim 5, wherein the control units produce a puncturing or repetition pattern based on the UMTS standard 3GPP TS 25.212.

8. The apparatus as claimed in claim 1, further comprising an input memory for buffer-storing at least one input data word, the input memory comprising a plurality of registers which are respectively designed to store a bit.

9. The apparatus as claimed in claim 8, further comprising a first rewriteable memory connected upstream of the input memory for storing input data blocks.

10. The apparatus as claimed in claim 1, further comprising an output memory for buffer-storing at least one output data word, the output memory comprising a plurality of registers which are respectively designed to store a bit.

11. The apparatus as claimed in claim 10, further comprising a second rewriteable memory connected downstream of the output memory for storing output data blocks.

12. A method for operating an apparatus, the method comprising:
outputting an input data block comprising a plurality of bits as an output data block with at least one puncturing or with at least one repetition of at least one bit, where the input data block contains a plurality of input data words having a respective plurality of bits, and the output data block contains output data words associated with the input data words;
association the bits in an input data word by an association unit of the apparatus with the bits in the associated output data word on the basis of an alterable puncturing or repetition pattern ($inc_w(k)$), the association unit being a hardware circuit which is designed to execute both puncturing and repetitive coding, and the association unit having a plurality of association elements (MUXw) which each have a logic input and a logic output for associating a bit in an input data word with one or no bit in the associated output data word;
producing the puncturing or repetition pattern ($inc_w(k)$) by a control unit of the apparatus on the basis of prescribed puncturing or repetition information;
producing first addresses ($pd_w(k)$) by a first address generation unit of the apparatus for the logic outputs ($p_o(w)$) of the association elements (MUXw) for respective association with a bit in the output data word on the basis of the puncturing pattern ($inc_w(k)$);
producing second addresses ($pd_w(k)$) by a second address generation unit for the logic inputs ($p_i(w)$) of the association elements (MUXw) for respective association with a bit in the input data word on the basis of the repetition pattern ($inc_w(k)$), where the apparatus has Wmax association elements MUXw (w=0,1, ..., Wmax-1), and the input data word has Lmax bits;
operating the apparatus in cycles k (k=0,1,2, ...);
producing Wmax control signals ($inc_w(k)$) in each cycle k using the control unit;
producing a first address $pd_w(k)$ for each association element MUXw using the first address generation unit;
wherein a first initialization address pdini(k) is used to initialize the cycle k, the first addresses $pd_w(k)$ being calculated on the basis of the following recursive rules:

$$pd_0(k) = pd_{ini}(k) \qquad (1)$$

$$pd_w(k) = (pd_{w-1}(k) + inc_{Wmax-1}(k)) \bmod Lmax \qquad (2)$$

$$pd_{ini}(k+1) = (Pd_{Wmax-1}(k) + inc_{Wmax-1}(k)) \bmod Lmax \qquad (3)$$

$$pd_{ini}(0) = 0 \qquad (4)$$

where $inc_w(k)=0$ indicates that the bit applied to the input of the association element MUXw needs to be punctured or repeated, and $inc_w(k)=1$ indicates that the bit applied to the input of the association element MUXw does not need to be punctured and does not need to be repeated, and where puncturing the bit applied to the input of the association element MUXw involves the logic output ($p_o(w)$) of the association element MUXw being disabled.

13. The method as claimed in claim 12, wherein the second address generation unit produces a second address psw(k) in each cycle k for each association element MUXw;
wherein a second initialization address $ps_{ini}(k)$ is used to initialize the cycle k; and
wherein the second addresses $ps_w(k)$ are calculated on the basis of the following recursive rules:

$$ps_0(k) = ps_{ini}(k) \qquad (5)$$

$$ps_w(k) = (ps_{w-1}(k) + 1) \bmod Lmax \qquad (6)$$

$$ps_{ini}(k+1) = (ps_{Wmax-1}(k) + 1) \bmod Lmax \qquad (7)$$

$$ps_{ini}(0) = 0 \qquad (8).$$

* * * * *

UNITED STATES PATENT AND TRADEMARK OFFICE
CERTIFICATE OF CORRECTION

PATENT NO. : 7,278,087 B2
APPLICATION NO. : 10/505055
DATED : October 2, 2007
INVENTOR(S) : Michael Speth It is certified that error appears in the above-identified patent and that said Letters Patent is hereby corrected as shown below:

Column 5, line 65: Please replace the equation "pi(w+1)" with the equation --pi(w+1)--.

Column 6, line 48: Please replace the words "eplus. added" with the words --eplus added--.

Column 7, line 11: Please replace the equation "pdw(k)=pdWmax-1(k)+incWmax-1(k)) mod Vmax" with the equation --pdw(k)=pdw-1(k) + incw-1(k))) mod Vmax--

Column 9, line 30 Claim 4, line 30: Please replace the words "memory. connected" with the words --memory connected--.

Column 9, Line 65 Claim 12, line 65: Please replace the word "association" with the word --associating--.

Column 10, Line 36 Claim 12, line 36: Please replace the equation "pdw(k)=pdWmax-1(k)+incWmax-1(k)) mod Vmax" with the equation --pdw(k)=pdw-1(k) + incw-1(k))) mod Vmax-- .

Signed and Sealed this

Twenty-seventh Day of November, 2007

JON W. DUDAS
*Director of the United States Patent and Trademark Office*